United States Patent Office 2,870,204
Patented Jan. 20, 1959

2,870,204

PREPARATION OF PHOSPHONOTHIOIC DICHLORIDES, TETRACHLOROPHOSPHORANES, AND PHOSPHONIC DICHLORIDES

Hans Z. Lecher, Plainfield, and Ruth A. Greenwood, Somerville, N. J., assignors to American Cyanamid Company, New York, N. Y., a corporation of Maine No Drawing. Application March 25, 1955
Serial No. 496,948

19 Claims. (Cl. 260—543)

This invention relates to a new process for making phosphonothioic dichlorides, $RPSCl_2$, and tetrachlorophosphoranes, $RPCl_4$, which can be readily transformed into phosphonic dichlorides, $RPOCl_2$, by known methods.

Phosphonothioic dichlorides and phosphonic dichlorides are starting materials for esters, amides and ester-amides of phosphonothionic acids and of phosphonic acids which are of interest in the fields of pesticides, lubricating oil additives and flame-resistant resins.

The intermediate dichlorides in which R is an aryl group have been prepared in the past by various methods which were both cumbersome and expensive. A more direct method of preparing aryl-phosphonic dichlorides is described and claimed in the copending applications of Lecher, Chao and Whitehouse, Serial No. 345,264, filed March 27, 1953, now U. S. Patent 2,717,906, issued September 13, 1955, and Greenwood, Scalera, and Lecher, Serial No. 357,368, filed May 25, 1953 now Patent No. 2,814,645. In these processes aromatic compounds free from polar groups capable of reacting with phosphoric anhydride were phosphonated with hexagonal phosphoric anhydride in a temperature range of 250–325° C. and the products obtained were converted to aryl-phosphonic dichlorides by reaction with phosphorus pentachloride. This process for the first time made these compounds practically available, but still left considerable to be desired from the point of cost because in the reaction of the aromatic compound with the hexagonal phosphoric anhydride only one or at most two of the phosphorus atoms reacted with the aromatic compound. The remaining phosphorus had to be removed as phosphorus oxychloride. Another disadvantage with certain aromatic compounds, such as naphthalene or alkyl derivatives of benzene was that the phosphoric anhydride catalyzed condensation reactions which formed by-products and therefore lowered the yield.

The phosphonothioic dichlorides were prepared in the past from alkyl and aryldichlorophosphines by the addition of sulfur, preferably in the presence of catalysts such as aluminum chloride, or by the aid of thiophosphoryl chloride or sulfur monochloride. These processes also were not practical because of the complicated and expensive methods for preparing the alkyl and aryldichlorophosphines.

In the copending application of Chao, Lecher and Greenwood, Serial No. 402,392, filed January 5, 1954, now abandoned, there is described the reaction of phosphorus pentasulfide with aromatic compounds, free from polar groups capable of reacting with the pentasulfide, the reaction temperatures ranging from 140–250° C. Hydrogen sulfide was evolved and primary reaction products were formed in which the ratio of phosphorus to aromatic radicals entering the reaction is substantially stoichiometrical, thus effecting a marked saving in the utilization of phosphorus over the reactions of phosphoric anhydride with aromatic compounds. The primary reaction products were hydrolyzed to give phosphonic acids.

The present invention utilizes these primary reaction products of the Chao, Lecher and Greenwood application as starting materials and produces phosphonothioic dichlorides and tetrachlorophosphoranes by chlorination of the reaction products of phosphorus pentasulfide with aromatic compounds or as will be described below also with certain other hydrocarbons containing double bonds. The reaction proceeds readily and either product can be prepared, depending on the amount of chlorinating agent used.

Previously obtained crude reaction products of phosphorus pentasulfide with various hydrocarbons have never been subjected to the action of chlorinating agents. Pure thionophosphine sulfides have not been known with the single exception of $\Delta^2$-cyclohexenylthionophosphine sulfide which, however, has not been chlorinated either. It was unpredictable how compounds of this type $(R-PS_2)_2$ would behave with chlorinating agents and it was surprising that they could be so smoothly subjected to the transformations disclosed in this application.

I. THE PHOSPHONATION REACTION

This reaction is applicable in general to aromatic compounds which are free of polar substituents capable of reacting with phosphorus pentasulfide. Among the important groups are hydrocarbons such as benzene and its homologs, naphthalene and its homologs, anthracene, and phenanthrene; monocyclic, monohydric phenol ethers such as anisole, phenetole. The phenol ethers react with special ease and give very high yields of pure primary reaction products. This is surprising because ether groups are reactive with phosphoric anhydride. It is not known why there is no significant reaction of the ether group with phosphorus pentasulfide, and the invention is not limited to any theory of why the phenol ethers react with such ease and without any substantial attack on the ether group.

Not only aromatic hydrocarbons can be subjected to this reaction but also aliphatic hydrocarbons containing one double bond and monocyclic hydrocarbons containing one double bond, such as commercial isooctene (diisobutylene), butene-1 and -2, isobutene (isobutylene), cyclohexene, cyclopentene, etc.

The reaction temperature will vary with the compounds; thus for example, some of the phenol ethers such as anisole react very smoothly and quantitatively at about the boiling point, naphthalene gives best results at about 160–180°, but, on the other hand, benzene and some of its homologs such as o-xylene require temperatures of about 225° for best results. Olefins and cycloolefins react at lower temperatures, e. g. diisobutylene at about 100° and cyclohexene slowly at about 80°. In general, with each compound it is desirable to operate at as low a temperature as possible in the range of optimum temperatures, i. e., as low temperatures as produce reasonably fast evolution of hydrogen sulfide. Higher temperatures in the case of each compound, while still giving good yields, are less desirable as there is some effect on the yield and purity of the primary reaction products obtained.

A very important and critical requirement is the use of a large excess of the compound to be phosphonated. In general, the excess should be at least 5 moles per mole of $P_4S_{10}$, but in some cases, like in that of cyclohexene, a much larger excess is necessary.

The main reaction proceeds according to the equation

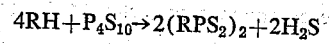

where R stands for the organic radical. However, side reactions take place in varying degrees with some aromatic compounds resulting in the production of lower sulfides of phosphorus which are not reactive. In the case of ethers of monocyclic, monohydric phenols, this side reaction is insignificant, but with benzene and naphthalene it takes place to a considerable extent. When a sparingly soluble lower sulfide of phosphorus is formed it crystallizes together with the aromatic sulfide contaminating the latter. This is of little consequence if it is to be used as intermediate in the chlorination to give a tetrachlorophosphorane or phosphonothioic dichloride since the thiophosphoryl chloride formed as by-product from the phosphorus sulfides is easily removable.

Some of the arylthionophosphine sulfides, in particular, p-anisylthionophosphine sulfide, tenaciously retain the solvent from which they have been crystallized. It can be removed only by drying under reduced pressure at elevated temperatures. We are apparently dealing with rather stable clathrate compounds. Thus p-anisylthionophosphine sulfide crystallized from anisole and dried in a vacuum desiccator at ordinary temperature still contained about 12% of anisole; after re-crystallization from o-dichlorobenzene and washing with benzene it contained about 7% benzene which was even more tenaciously held than the anisole. This phenomenon is of no consequence in the further use of these products in the process of this invention.

The molecular weight of p-anisylthionophosphine sulfide, determined on a sample entirely freed from solvent, indicated a dimeric compound. Likewise the molecular weight determination of phenyl thionophosphine sulfide indicated a dimer when the occluded solvent was taken into account.

In the reaction of anisole with $P_4S_{10}$ the latter attacks predominately the nucleus. However, to a very minor extent it attacks also the methoxy group as evidenced by the formation of some methyl mercaptan when the mother liquors from the crystallized thionophosphine sulfide are hydrolyzed.

The reactivity of different aromatic compounds varies and so does the yield of the thionophosphine sulfide. It is highest with lower alkylphenol ethers such as anisole. However, in each case the yield is superior to that obtainable by the reaction of the aromatic compound with hexagonal phosphoric anhydride.

In the case of the phosphonation of olefins and cycloolefins the double bond is not directly affected and is still present in the primary reaction product and its chlorinated derivatives. The reaction of cyclohexene with phosphorus pentasulfide is known in the art and it has been shown that the phosphorus is not attached to a carbon atom participating in the double bond but rather to a neighboring carbon atom.

During the reaction, at least partly in its first stage, the presence of large amounts of oxygen is undesirable. In large scale equipment the free air space—for example, in suitable autoclaves—is so small that no serious precautions need be taken. However, in smaller equipment an inert gas atmosphere is preferable.

It is an advantage that a commercial grade of phosphorus pentasulfide can be used. The use of a very pure grade offers but little advantage. The lower sulfides of phosphorus such as $P_4S_3$ or $P_4S_7$ do not phosphonate aromatic compounds such as anisole. When they are used together with sulfur, $P_4S_{10}$ is formed and such mixtures are therefore the chemical equivalents of $P_4S_{10}$. However, there is no advantage in using such mixtures and the yields obtained with pre-formed $P_4S_{10}$ are generally better. It is also possible to use elemental phosphorus and sulfur but this does not offer advantages.

The primary reaction products are isolated by filtration if sparingly soluble, otherwise by evaporation of the excess of the compounds subjected to the phosphonation reaction.

II. THE CHLORINATION REACTION

According to the present invention, the primary reaction products dealt with in the foregoing chapter are subjected to the action of chlorinating agents such as elemental chlorine, sulfuryl chloride, sulfur dichloride, sulfur monochloride, or phosphorus pentachloride. This chlorination proceeds in two steps which will be discussed with the primary reaction product of anisole and phosphorus pentasulfide. This is a homogeneous compound, whereas certain other crude reaction products of hydrocarbons are mixtures.

Step 1

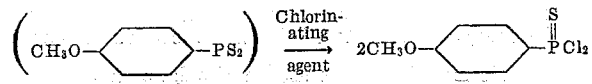

Step 2

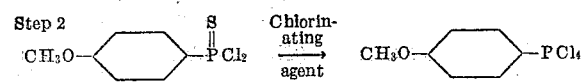

With the exception of sulfur monochloride, the above-mentioned chlorinating agents can perform both steps and it depends upon the amount of the agent whether the reaction stops at the stage of the phosphonothioic dichloride or proceeds part or all the way to the tetrachlorophosphorane. At ordinary or slightly elevated temperature sulfur monochloride performs only Step 1.

In these chlorination reactions sulfur is replaced by chlorine. The sulfur is removed as elemental sulfur when sulfur monochloride is used or as thiophosphoryl chloride when phosphorus pentachloride is used. When chlorine, sulfur dichloride or sulfuryl chloride are used, it depends upon the ratios of the reactants whether the removed sulfur appears as such or as sulfur mono- or dichloride; in the case of sulfuryl chloride also sulfur dioxide and thionyl chloride are formed. At any rate, the inorganic chlorides formed as by-products boil much lower than the desired organophosphorus compounds and therefore are easily removable. Any elemental sulfur formed can be separated because of its low solubility in most organic solvents. Because of its low cost chlorine is the preferred agent for practical purposes.

Most reactions proceed at room or slightly elevated temperature but may be completed at the reflux temperature of the solvent used.

For maximum ease in practical operation, it is desirable to carry out the chlorination in an inert diluent such as highly halogenated hydrocarbons, for instance carbon tetrachloride, phosphorus oxychloride or other inert liquids.

As has been pointed out above, the amount of chlorinating agent will vary, depending on whether it is desired to produce a phosphonothioic dichloride or the corresponding tetrachlorophosphorane. In the former case essentially stoichiometric amounts of the chlorinating agent are used. In the latter case larger amounts are necessary. The primary products from the phosphonation reaction are generally not soluble in carbon tetrachloride, but the phosphonothioic dichlorides, as formed, go into solution. It is an easy matter to recover them after removing the solvent and inorganic by-products by distillation, since the phosphonotioic dichlorides for the most part can be distilled under reduced pressure.

When it is desired to produce phosphonic dichlorides, an excess of the chlorinating agent is used to produce the tetrachlorophosphoranes and this sometimes results in a reprecipitation of the phosphorus compounds in the form of the tetrachlorophosphoranes, some of which are not readily soluble in the reaction medium, such as carbon tetrachloride. In such a case the tetrachlorophosphorane may be isolated before its conversion into the phosphonic dichloride, but this is not necessary and the crude chlorination mixture can be treated with sulfur dioxide or hydrolyzing agents such as water or organic acids to effect the desired conversion. Then the solvent and inorganic by-products are distilled off and the desired product is recovered by distillation under reduced pressure. This last process is shown for the tetrachlorophosphorane from anisole by the following reactions:

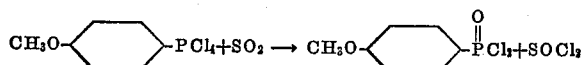

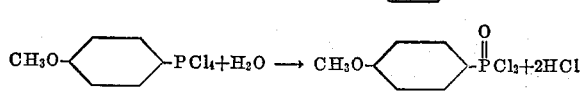

The invention will be illustrated in greater detail in the following specific examples in which the parts are by weight unless otherwise specified.

Example 1

PHENYLPHOSPHONOTHIOIC DICHLORIDE

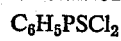

175.8 parts of benzene and 48.8 parts of phosphorus pentasulfide are heated with agitation in a stainless steel autoclave at 225° C. until reaction is complete. The autoclave contents consist of a tan solid primary reaction product and excess benzene. The solid is separated by filtration and washed with benzene.

7.04 parts of the primary reaction product, prepared as described above, is added to 83.7 parts of phosphorus oxychloride. 13 parts of phosphorus pentachloride is added gradually to the mixture. The charge is heated slowly to the boiling point and refluxed for two hours. The inorganic acid chlorides are removed by distillation and the phenylphosphonothioic dichloride is distilled under reduced pressure.

The dichloride is converted by known conventional processes into the ethyl-4-nitrophenyl ester which is a well-known insecticide.

Example 2

PHENYLPHOSPHONOTHIOIC DICHLORIDE $C_6H_5PSCl_2$

The primary reaction product of benzene and phosphorus pentasulfide is prepared as described in Example 1 and slurried in 239 parts of carbon tetrachloride. Then chlorine is introduced until a clear solution results in a slightly exothermic reaction. The carbon tetrachloride and the sulfur chlorides produced in the reaction are distilled off and the phenylphosphonothioic dichloride is recovered by distillation under reduced pressure.

Example 3

PHENYLPHOSPHONIC DICHLORIDE

Chlorine is passed into a solution of 11.97 parts of phenylphosphonothioic dichloride in 39.9 parts of carbon tetrachloride until no temperature rise is noted. A flocculent white precipitate of phenyltetrachlorophosphorane is formed. Then sulfur dioxide is passed into the solution to form the phenylphosphonic dichloride. The latter is isolated by distilling off the carbon tetrachloride and the inorganic chlorides and distilling it under reduced pressure.

The dichloride is converted by customary processes into the diallyl ester which is known as a starting material for the preparation of flame-resistant resins. (See J. Am. Chem. Soc., vols. 70, p. 186; 76, p. 2191; and Ind. and Eng. Chem., vol. 40, p. 2276.)

Example 4

2-NAPHTHYLPHOSPHONOTHIOIC DICHLORIDE

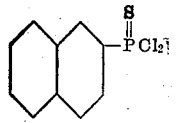

640 parts of naphthalene and 44.4 parts of phosphorus pentasulfide are heated with stirring at a temperature of 165–170° C. until the evolution of hydrogen sulfide ceases. The reaction mixture is cooled to 80° C. and 440 parts of benzene is added. The precipitate which has formed on cooling is filtered off and thoroughly washed with benzene.

12.15 parts of the crude 2-naphthylthionophosphine sulfide thus obtained is slurried in 120 parts of carbon tetrachloride. Chlorine is introduced until the solid disappears and a clear yellow-orange solution is obtained.

The sulfur chlorides and carbon tetrachloride are removed by distillation after which the 2-naphthylphosphonothioic dichloride distills at 173–174° C. (4 mm.) The product solidifies on cooling, melting point 38–41° C. The yield is excellent.

Example 5 p-ANISYLPHOSPHONOTHIOIC DICHLORIDE

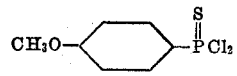

108 parts of anisole and 44.4 parts of phosphorus pentasulfide are heated gradually with stirring to the reflux temperature (145–155° C.) until the evolution of hydrogen sulfide ceases. The reaction mixture is cooled and the precipitate which has formed is filtered off and washed with benzene. The dimeric p-anisylthionophosphine sulfide thus obtained melts at about 225°.

12.28 parts of the crude product is mixed with 84 parts of phosphorus oxychloride. 14 parts of phosphorus pentachloride is added slowly. The product dissolves gradually, forming a clear yellow solution. This solution is then refluxed for one hour. Sulfur dioxide is passed in to destroy excess phosphorus pentachloride. The inorganic chlorides are removed before the desired p-anisylphosphonothioic dichloride is distilled as a light yellow liquid at 155–157° C. (8 mm.).

This dichloride is converted by conventional means into the ethyl-4-nitrophenyl ester which is an excellent insecticide. In the form of a 1 percent dust, the following percentage kills were obtained: milk weed bug, 100%; confused flower beetle, 95%. 0.1 percent feeding resulted in 100% kill of southern army worm and 90% kill of aphis rumicis.

Example 6 p-ANISYLPHOSPHONOTHIOIC DICHLORIDE

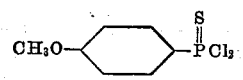

To 5 parts of the crude dimeric p-anisylthionophosphine sulfide, prepared as described in Example 5, is slowly added 9.7 parts of sulfur dichloride. In an exothermic reaction a light yellow solution forms. This solution is heated to a gentle reflux for one hour after which the sulfur chlorides are removed by distillation. The product, p-anisylphosphonothioic dichloride, is recovered by distillation under reduced pressure.

Example 7 p-ANISYLPHOSPHONOTHIOIC DICHLORIDE

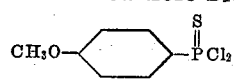

10 parts of the crude dimeric p-anisylthionophosphine sulfide, prepared as described in Example 5, is slurried in 79.8 parts of carbon tetrachloride. To this 11 parts of sulfuryl chloride is slowly added. A clear yellow solution is formed in a slightly exothermic reaction. After stirring for one hour at room temperature, the carbon tetrachloride and the inorganic chlorides are distilled off. The phosphonothioic dichloride is recovered by distillation under reduced pressure.

Example 8 p-ANISYLPHOSPHONOTHIOIC DICHLORIDE

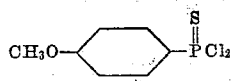

100 parts of the crude dimeric p-anisylthionophosphine sulfide, prepared as described in Example 5, is stirred with 319 parts of carbon tetrachloride and chlorine is introduced until a clear yellow solution results. During the chlorination the temperature is maintained below 50° C.

The carbon tetrachloride and the sulfur chlorides are removed and the residue is distilled under reduced pressure.

Example 9 p-ANISYLTETRACHLOROPHOSPHORANE AND p-ANISYLPHOSPHONIC DICHLORIDE

and

50 parts of the crude dimeric p-anisylthionophosphine sulfide, prepared as described in Example 5, is slurried in 160 parts of carbon tetrachloride. A steady stream of chlorine is introduced, causing a slight temperature rise. Chlorine addition is continued for four hours during which the solution turns from a light yellow to a deep red-orange. On cooling and standing, the white p-anisyltetrachlorophosphorane precipitates. This is filtered off and washed with carbon tetrachloride.

This product is put into 8 parts of thionyl chloride and sulfur dioxide is introduced for three hours, causing the precipitate to disappear and leaving a clear solution. After removal of the thionyl chloride by distillation, the desired p-anisylphosphonic dichloride distills at 136–138° C. (2–3 mm.).

Example 10 p-ANISYLPHOSPHONIC DICHLORIDE

74 parts of the crude dimeric p-anisylthionophosphine sulfide, prepared as described in Example 5, is slurried in 478 parts of carbon tetrachloride. Chlorine is passed into the reaction mixture until heat of reaction is no longer evident. The presence of a white flocculent precipitate confirms the formation of the p-anisyltetrachlorophosphorane. This is converted to the p-anisylphosphonic dichloride by passing sulfur dioxide into the reaction mixture. After the carbon tetrachloride and the sulfur chlorides have been removed by distillation, the p-anisylphosphonic dichloride distills at 148–149° C. (5 mm.).

This dichloride is converted by conventional means into the diallyl ester useful in the preparation of flame-resistant resins.

Example 11

$\Delta^2$-CYCLOHEXENYLPHOSPHONOTHIOIC DICHLORIDE

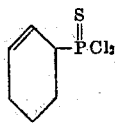

4.39 parts of dimeric $\Delta^2$-cyclohexenylthionophosphine sulfide (J. Am. Chem. Soc., vol. 74, p. 4933 (1952)) is added to 41.9 parts of phosphorus oxychloride. Gradually 5.2 parts of phosphorus pentachloride is added with stirring, causing a slight temperature rise. A clear yellow solution results. The inorganic chlorides are removed by distillation and then the $\Delta^2$-cyclohexenylphosphonothioic dichloride distills as a clear, colorless liquid at 94–96° C. (1 mm.).

Example 12

ISOOCTENYLPHOSPHONOTHIOIC DICHLORIDES

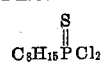

242 parts of commercial isooctene ("diisobutylene," a mixture of isomers) and 22.2 parts of phosphorus pentasulfide are slurried together and gradually heated to reflux temperature. Refluxing is continued until the evolution of hydrogen sulfide ceases. The reaction mixture is clarified by filtration and the excess diisobutylene is removed under reduced pressure. A thick syrup remains.

To this syrup there is added 16.75 parts of phosphorus oxychloride, then 41.6 parts of phosphorus pentachloride in small portions. The reaction mixture becomes fluid and is stirred for one hour. The inorganic chlorides are removed by distillation and the mixture of isomeric octenylphosphonothioic dichlorides distills from 78–96° C. (2 mm.).

Example 13 p-ANISYLPHOSPHONOTHIOIC DICHLORIDE

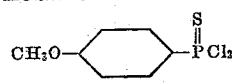

10.1 parts p-anisylthionophosphine sulfide, prepared as described in Example 5, is slurried in 40 parts carbon tetrachloride. To this slurry 33.75 parts sulfur monochloride is added. The solid p-anisylthionophosphine sulfide and sulfur monochloride react to form a yellow-orange solution. The carbon tetrachloride and excess sulfur monochloride are removed by distillation, the latter under reduced pressure.

On cooling, the residue from the distillation partially solidifies. The p-anisylphosphonothioic dichloride is dissolved in carbon tetrachloride, and sulfur formed in the reaction is removed by filtration.

The solvent, carbon tetrachloride, is removed by distillation and the p-anisylphosphonothioic dichloride distills as a light yellow liquid under reduced pressure.

This application is in part a continuation of our co-pending application Serial No. 423,218, filed April 14, 1954, which is now abandoned.

We claim:

1. A process which comprises chlorinating the reaction product of $P_4S_{10}$ with a large excess of a compound R—H containing as the desired and major reactive constituents a compound of the formula $(RPS_2)_2$, in which R is the residue of a compound selected from the group consisting of olefins, monocyclic hydrocarbons having a single double bond, aromatic hydrocarbons and ethers of monocyclic, monohydric phenols.

2. A process according to claim 1 in which the chlorination is stopped when approximately two atoms of chlorine have been introduced into the compound $(RPS_2)_2$ to transform it into $RPSCl_2$.

3. A process according to claim 2 in which the chlorinating agent is elemental chlorine.

4. A process according to claim 3 in which the reaction is effected in a diluent liquid inert to chlorine.

5. A process according to claim 4 in which the diluent is carbon tetrachloride.

6. A process according to claim 1 in which the chlorination is continued until four atoms of chlorine have been introduced into the compound $(RPS_2)_2$ to transform it into $RPCl_4$.

7. A process according to claim 6 in which the chlorinating agent is elemental chlorine.

8. A process according to claim 7 in which the reaction is carried out in a liquid which is inert to chlorine.

9. A process according to claim 8 in which the liquid is carbon tetrachloride.

10. A process according to claim 1 in which the chlorinating agent is sulfuryl chloride and the chlorination is stopped when two atoms of chlorine are introduced to transform the compound $(RPS_2)_2$ into $RPSCl_2$.

11. A process according to claim 1 in which the chlorinating agent is sulfuryl chloride and the chlorination is continued until four atoms of chlorine are introduced into the compound $(RPS_2)_2$ to transform it into $RPCl_4$.

12. A process according to claim 1 in which the chlorinating agent is sulfur dichloride and the chlorination is stopped when two atoms of chlorine are introduced to transform the compound $(RPS_2)_2$ into $RPSCl_2$.

13. A process according to claim 1 in which the chlorinating agent is sulfur dichloride and the chlorination is continued until four atoms of chlorine are introduced into the compound $(RPS_2)_2$ to transform it into $RPCl_4$.

14. A process according to claim 1 in which the chlorinating agent is sulfur monochloride.

15. A process according to claim 1 in which the chlorinating agent is phosphorus pentachloride and the chlorination is stopped when approximately two atoms of chlorine are introduced into the compound $(RPS_2)_2$ to transform it into $RPSCl_2$.

16. A process according to claim 1 in which the chlorinating agent is phosphorus pentachloride and the chlorination is continued until four atoms of chlorine are introduced into the compound $(RPS_2)_2$ to transform it into $RPCl_4$.

17. p-Anisylphosphonothioic dichloride.
18. $\Delta^2$-cyclohexenylphosphonothioic dichloride.
19. An isooctenylphosphonothioic dichloride.

References Cited in the file of this patent

UNITED STATES PATENTS

| | | |
|---|---|---|
| 2,466,276 | Ritter | Apr. 5, 1949 |
| 2,672,459 | Kuh et al. | Mar. 16, 1954 |
| 2,683,168 | Jensen et al. | July 6, 1954 |
| 2,685,603 | Walsh | Aug. 3, 1954 |
| 2,724,726 | Craig | Nov. 22, 1955 |